US012658559B2

(12) United States Patent
So et al.

(10) Patent No.: US 12,658,559 B2
(45) Date of Patent: Jun. 16, 2026

(54) ANTENNA BOARD ASSEMBLY AND ANTENNA APPARATUS INCLUDING SAME

(71) Applicant: KMW INC., Hwaseong-si (KR)

(72) Inventors: Sung Hwan So, Hwaseong-si (KR); Oh Seog Choi, Hwaseong-si (KR); Yong Won Seo, Daejeon (KR); Seong Man Kang, Hwaseong-si (KR); Hyoung Seok Yang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 27 days.

(21) Appl. No.: 18/764,393

(22) Filed: Jul. 5, 2024

(65) Prior Publication Data

US 2024/0363993 A1 Oct. 31, 2024

Related U.S. Application Data

(63) Continuation of application No. PCT/KR2023/000356, filed on Jan. 9, 2023.

(30) Foreign Application Priority Data

Jan. 7, 2022 (KR) ........................ 10-2022-0002899
Jan. 9, 2023 (KR) ........................ 10-2023-0002648

(51) Int. Cl.
*H01Q 21/06* (2006.01)
*H01Q 1/22* (2006.01)
*H01Q 1/48* (2006.01)

(52) U.S. Cl.
CPC ................. *H01Q 1/22* (2013.01); *H01Q 1/48* (2013.01); *H01Q 21/065* (2013.01)

(58) Field of Classification Search
CPC ........ H01Q 1/246; H01Q 1/42; H01Q 9/0414; H01Q 15/14; H01Q 19/10; H01Q 21/00; H01Q 21/06; H01Q 21/24–30
See application file for complete search history.

(56) References Cited

U.S. PATENT DOCUMENTS 10,473,754 B2 * 11/2019 Park ..................... H01Q 1/3233
10,790,582 B2 * 9/2020 Shiozaki ............... G01S 13/931
(Continued)

FOREIGN PATENT DOCUMENTS

CN 110838623 A 2/2020
CN 110931987 A 3/2020
(Continued)

OTHER PUBLICATIONS

Office Action mailed on April 122 2025 from Japanese Patent Office for Application No. 2024-540688.
(Continued)

*Primary Examiner* — Hasan Islam

(57) ABSTRACT

The present invention relates to an antenna board assembly and an antenna apparatus including same. In particular, the antenna apparatus comprises an antenna board assembly including: a reflecting panel which is provided to reflect forward antenna beams radiated from a plurality of array antenna elements provided in front; a rear panel which is stacked and coupled to the rear surface of the reflecting panel and composed of a non-conductive material; and a front panel which is stacked and coupled to the front surface of the reflecting panel and composed of a non-conductive material, wherein the rear panel and the front panel are formed as a single body through dual injection molding so as to be stacked and coupled with respect to the reflecting panel. Therefore, the present invention provides the advantage of making it possible to improve system performance through the reduction of insertion loss.

14 Claims, 15 Drawing Sheets

(56) References Cited

U.S. PATENT DOCUMENTS

| | | | | |
|---|---|---|---|---|
| 11,469,487 | B2 * | 10/2022 | Xu | H01Q 23/00 |
| 11,476,565 | B2 * | 10/2022 | Sampo | H01Q 19/106 |
| 11,652,278 | B2 * | 5/2023 | Zimmerman | H01Q 9/0478<br>343/702 |

FOREIGN PATENT DOCUMENTS

| | | | |
|---|---|---|---|
| CN | 112186369 | A | 1/2021 |
| CN | 113097717 | A | 7/2021 |
| CN | 110838623 | B | 12/2021 |
| JP | 4069638 | B2 | 1/2008 |
| KR | 10-1831432 | B1 | 2/2018 |
| KR | 10-2206660 | B1 | 1/2021 |
| WO | 88/01444 | A1 | 2/1988 |

OTHER PUBLICATIONS

International Search Report mailed on Apr. 14, 2023 for International Application No. PCT/KR2023/000356 and its English translation.

European Search Report mailed Dec. 9, 2025 from European Patent Office for Application No. 23737463.2.

* cited by examiner

[FIG. 1A]
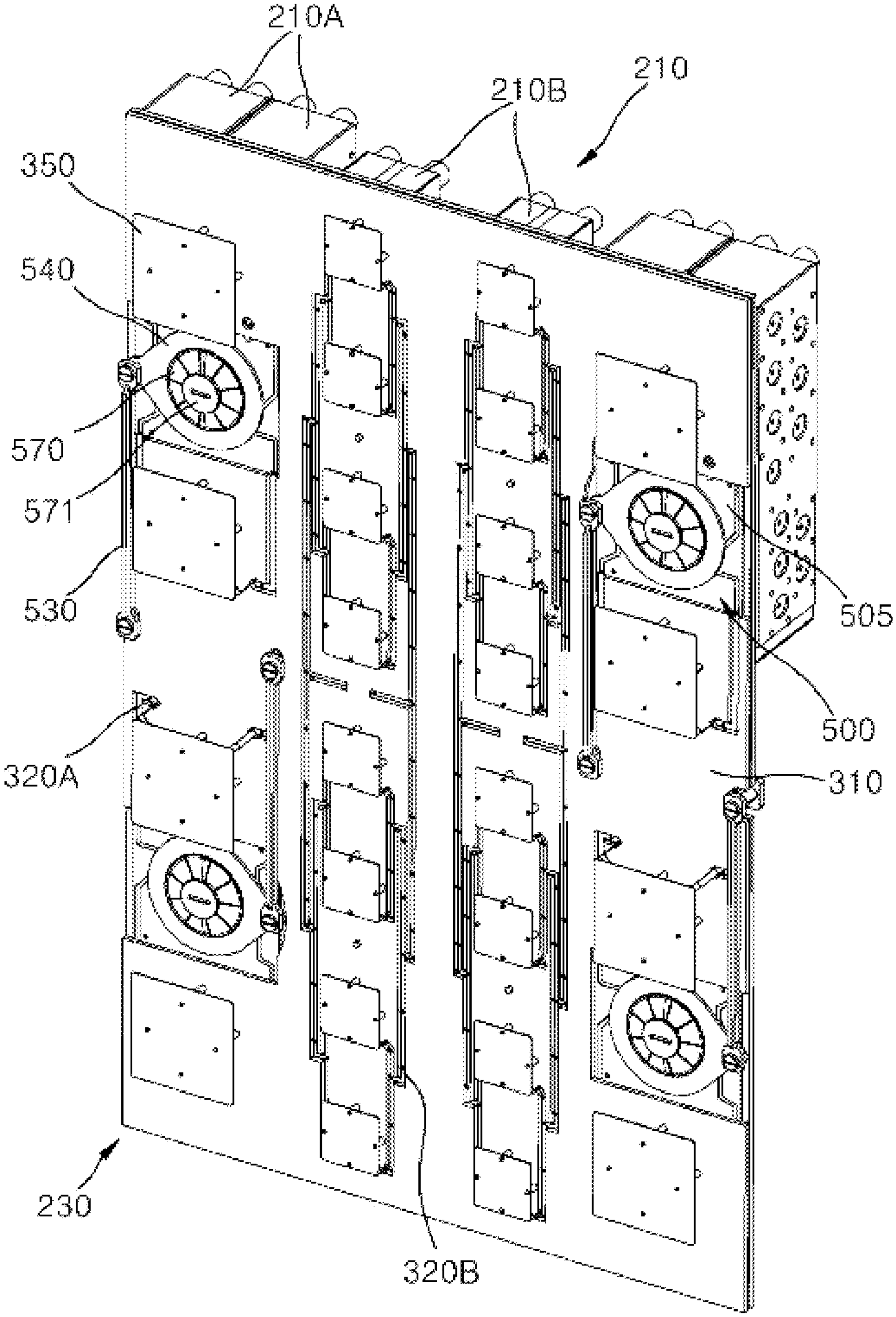

[FIG. 1B]
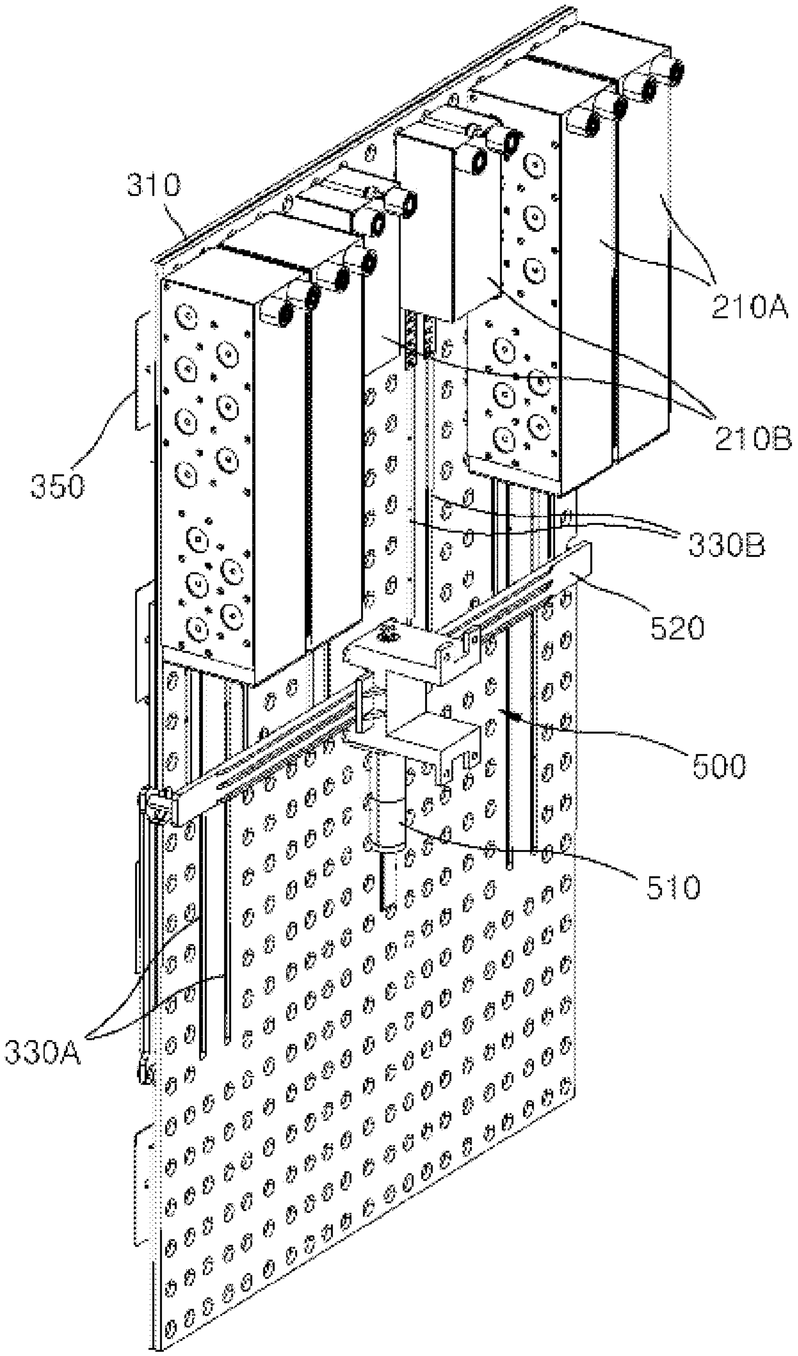

[FIG. 2]
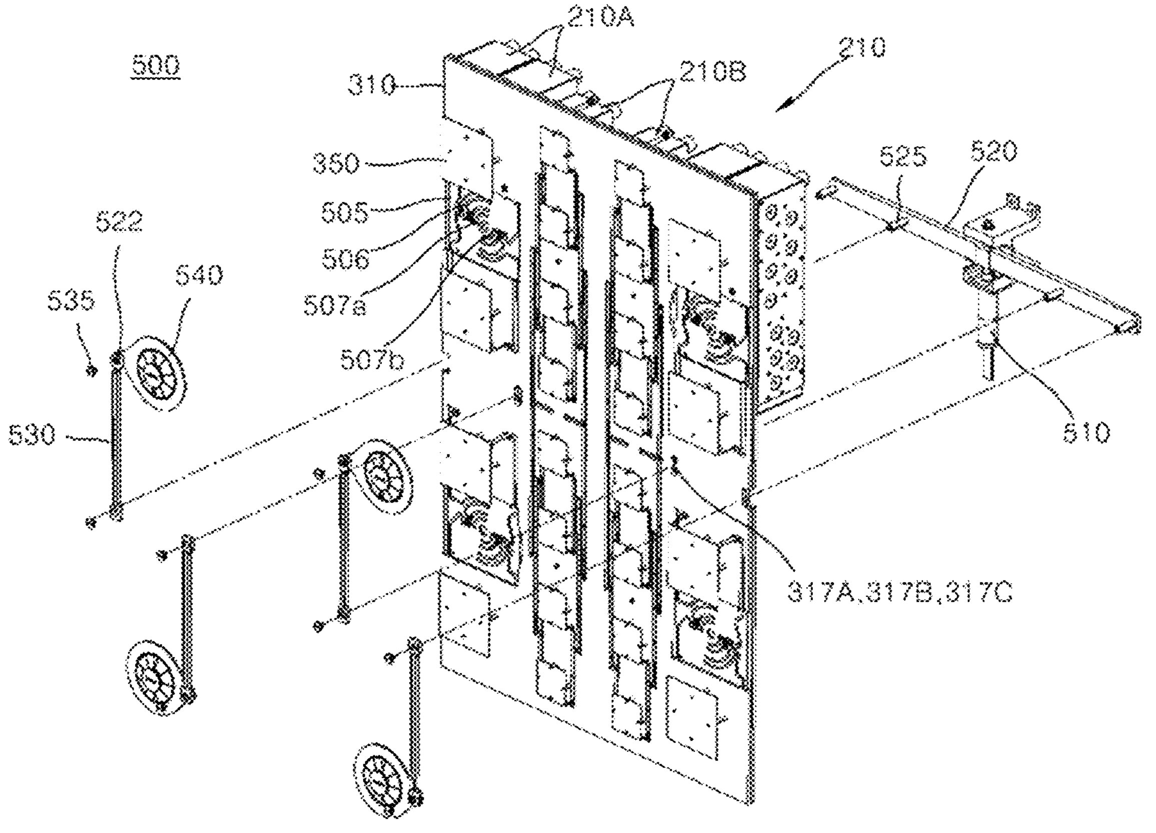

[FIG. 3A]
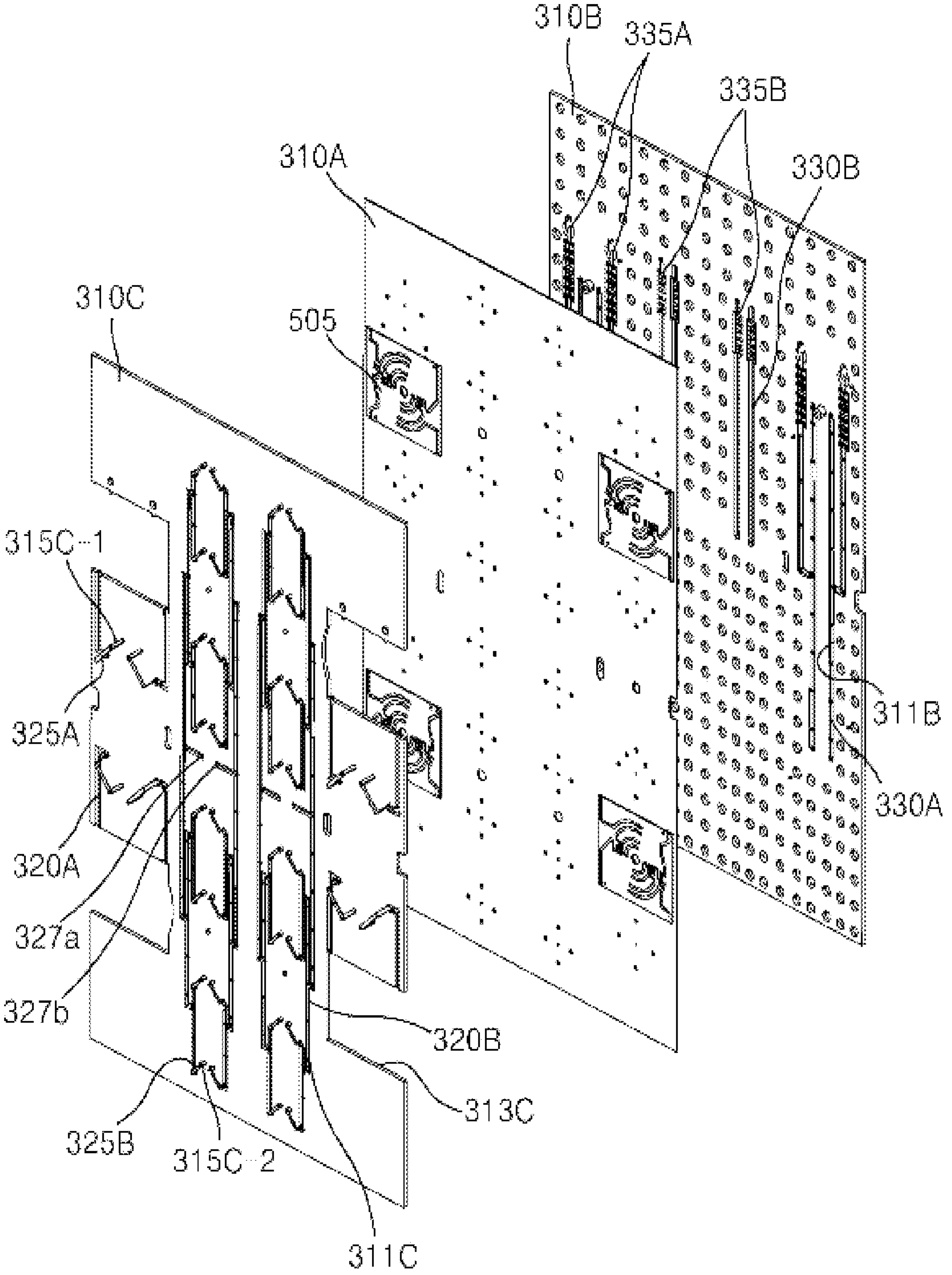

[FIG. 3B]
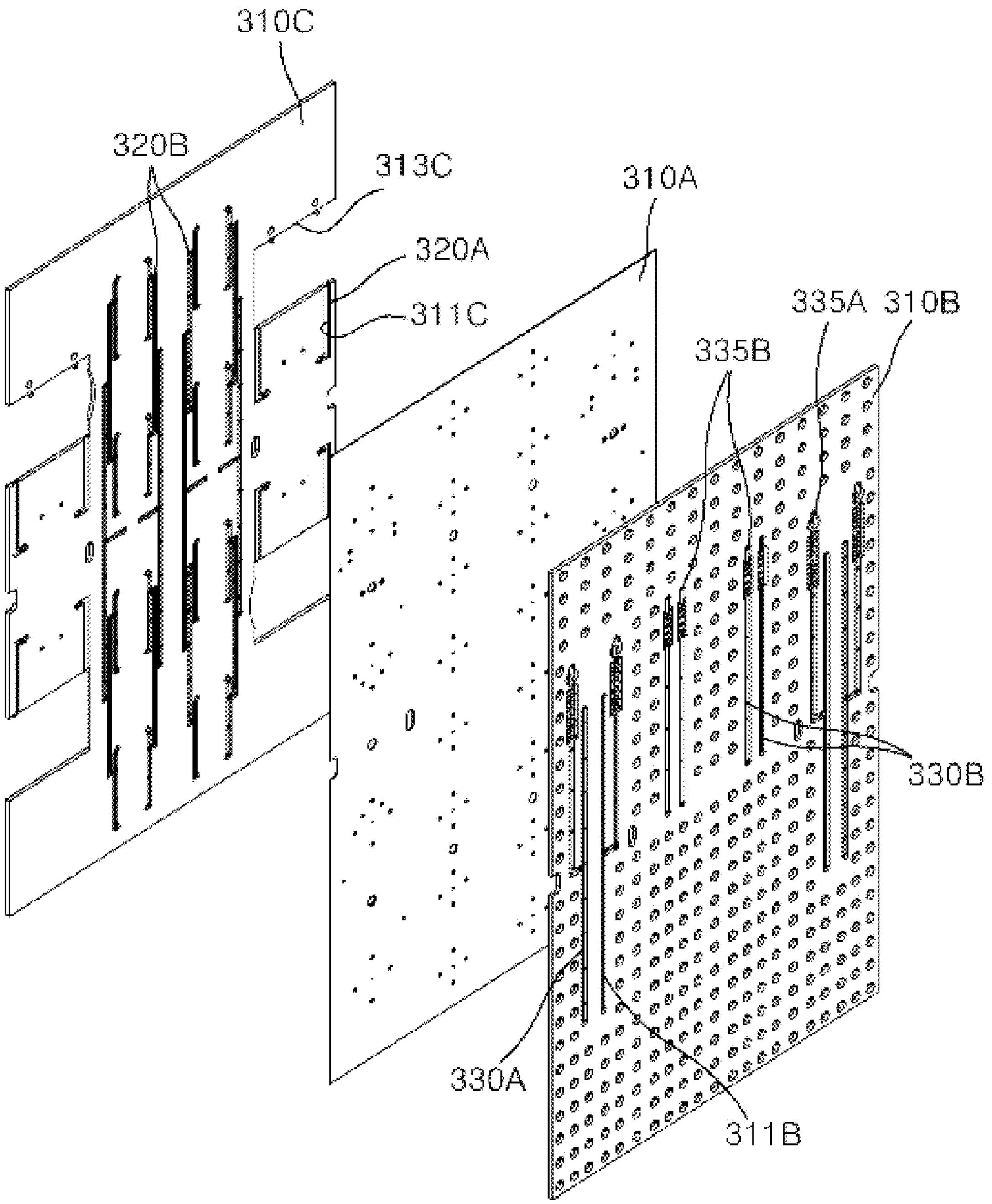

[FIG. 4A]
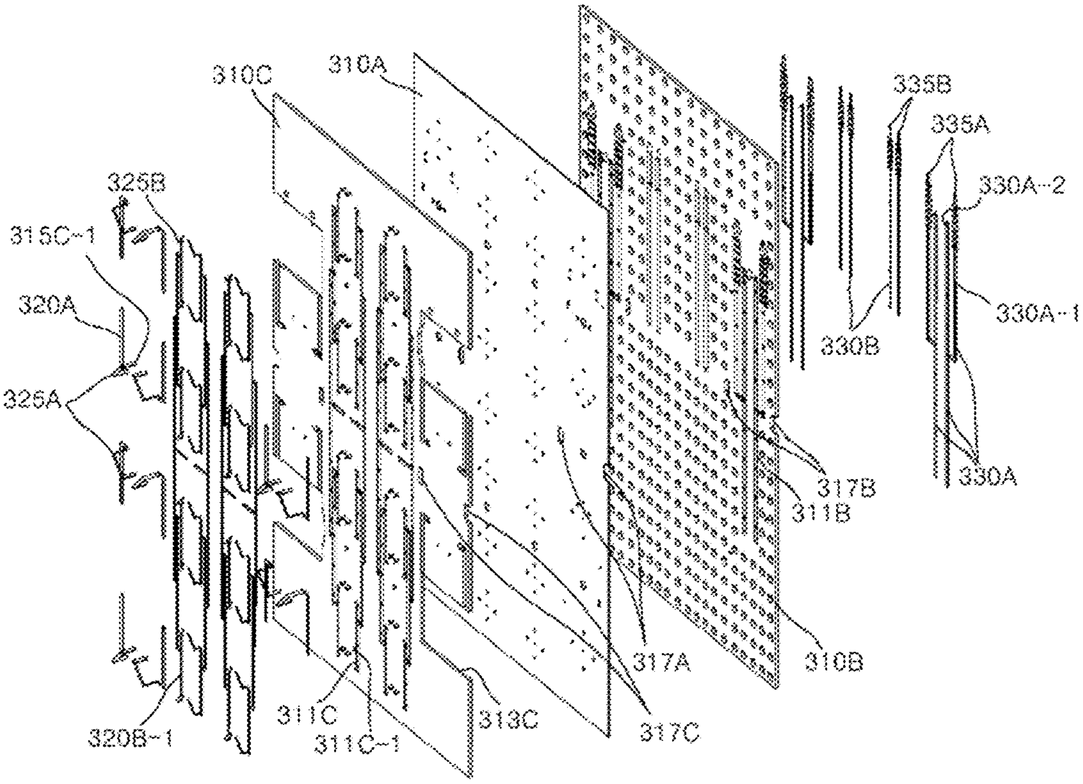

[FIG. 4B]
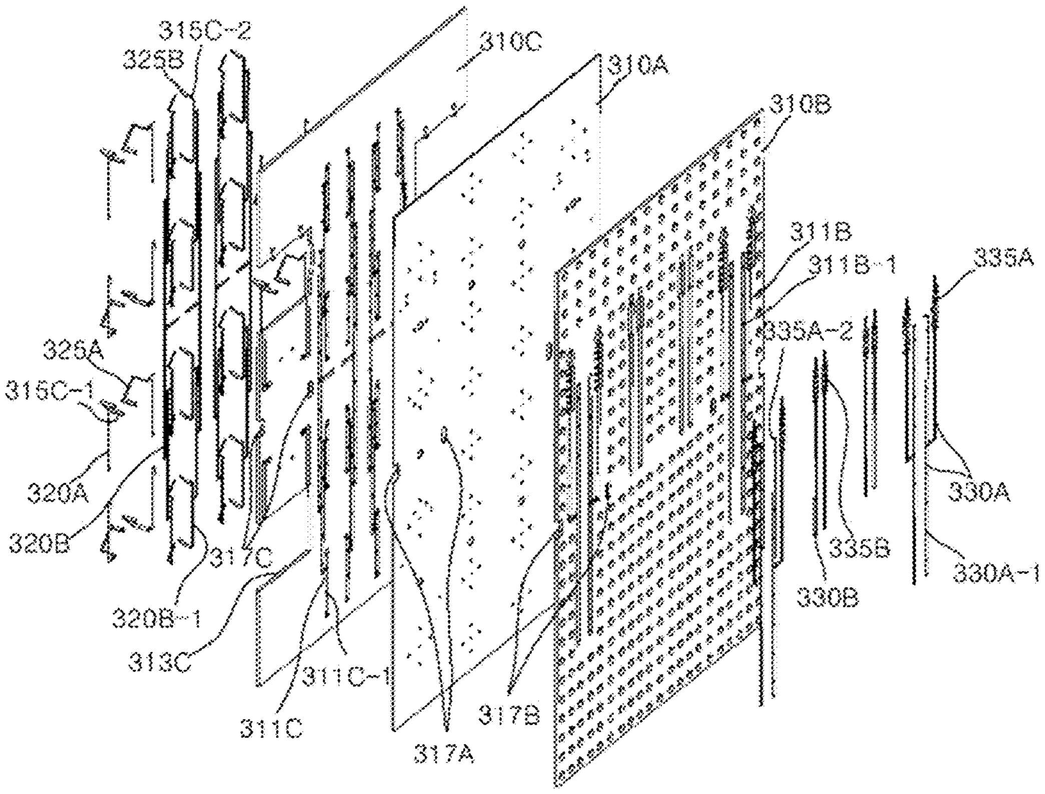

[FIG. 5A]
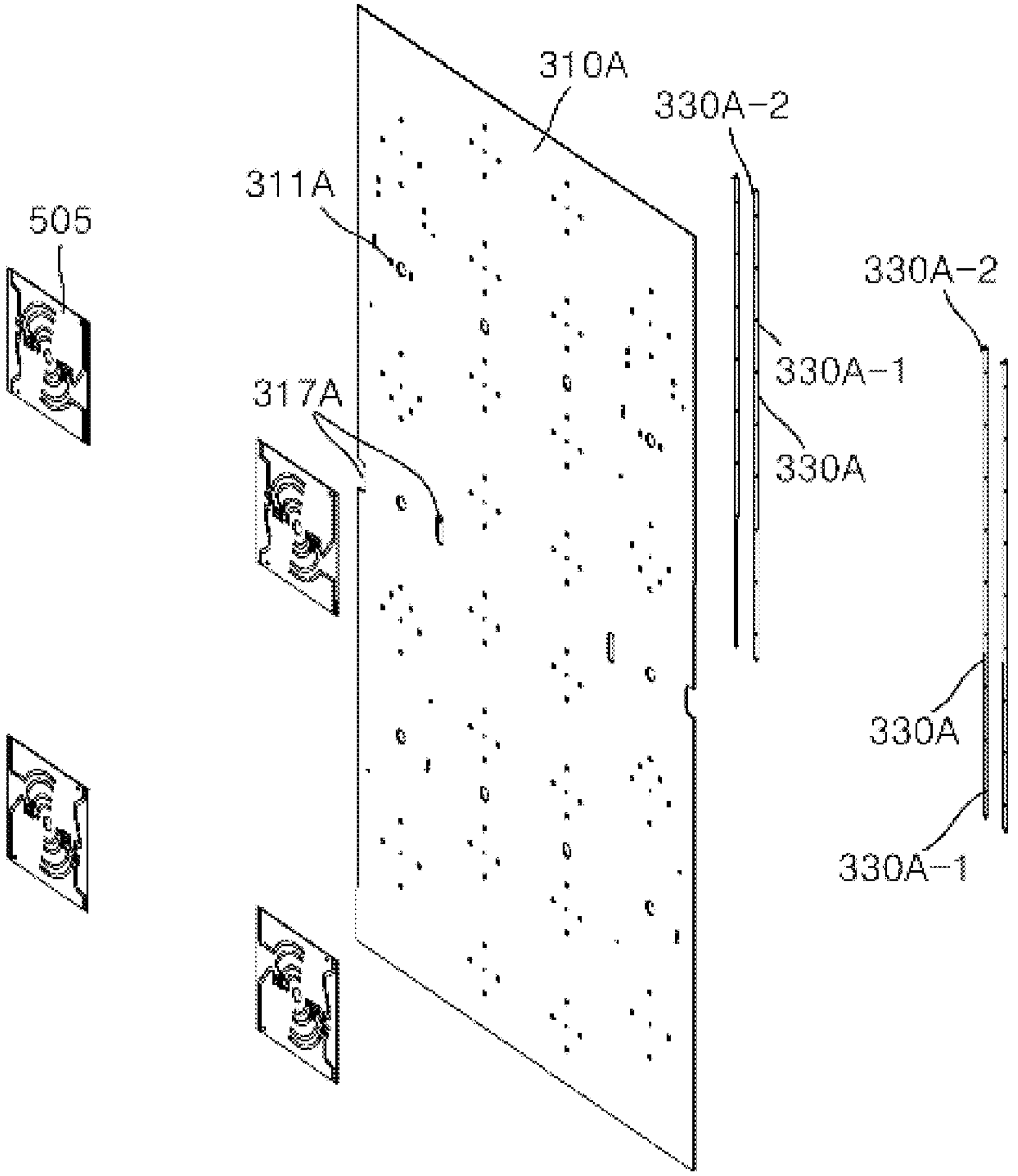

[FIG. 5B]
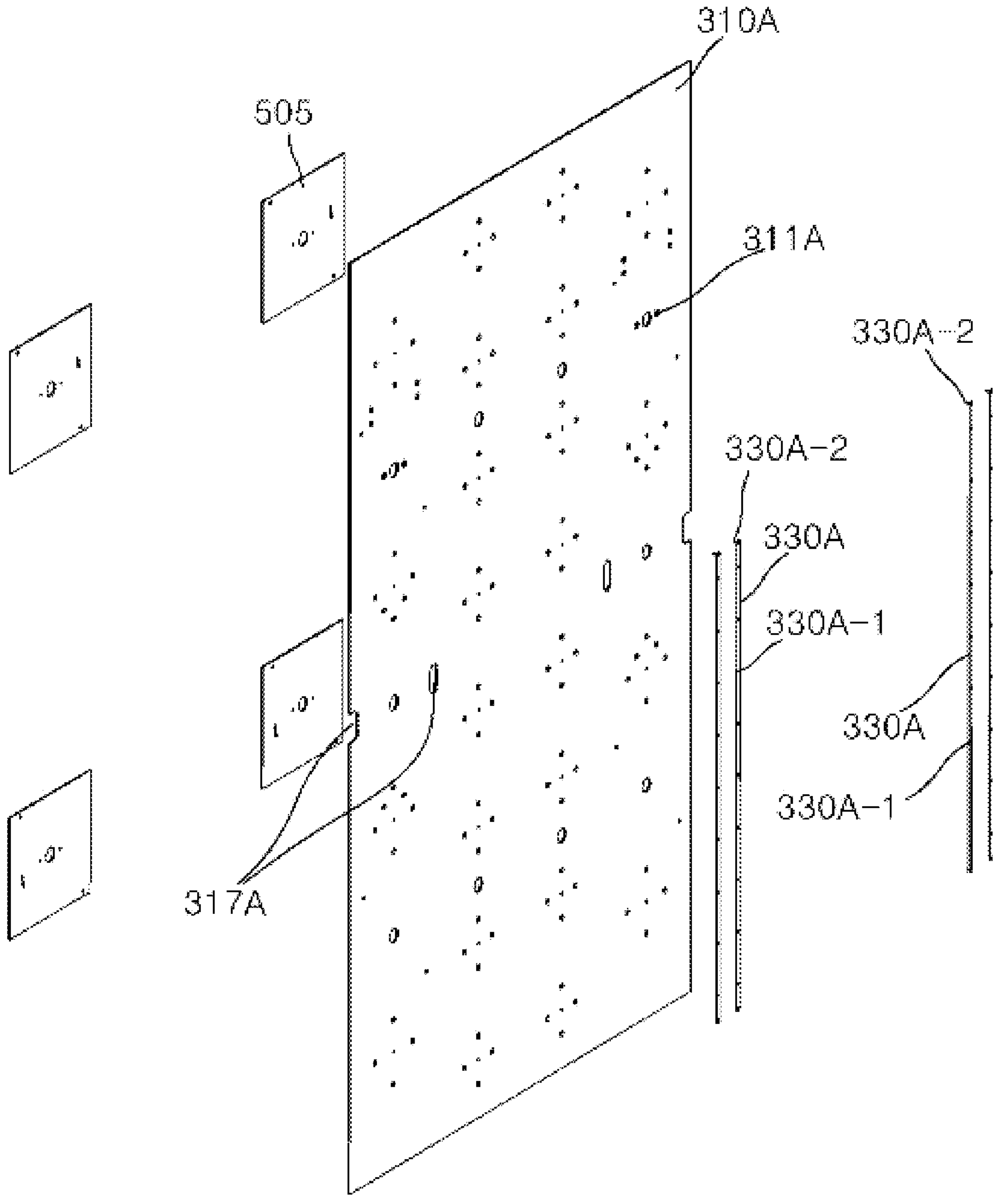

[FIG. 6A]
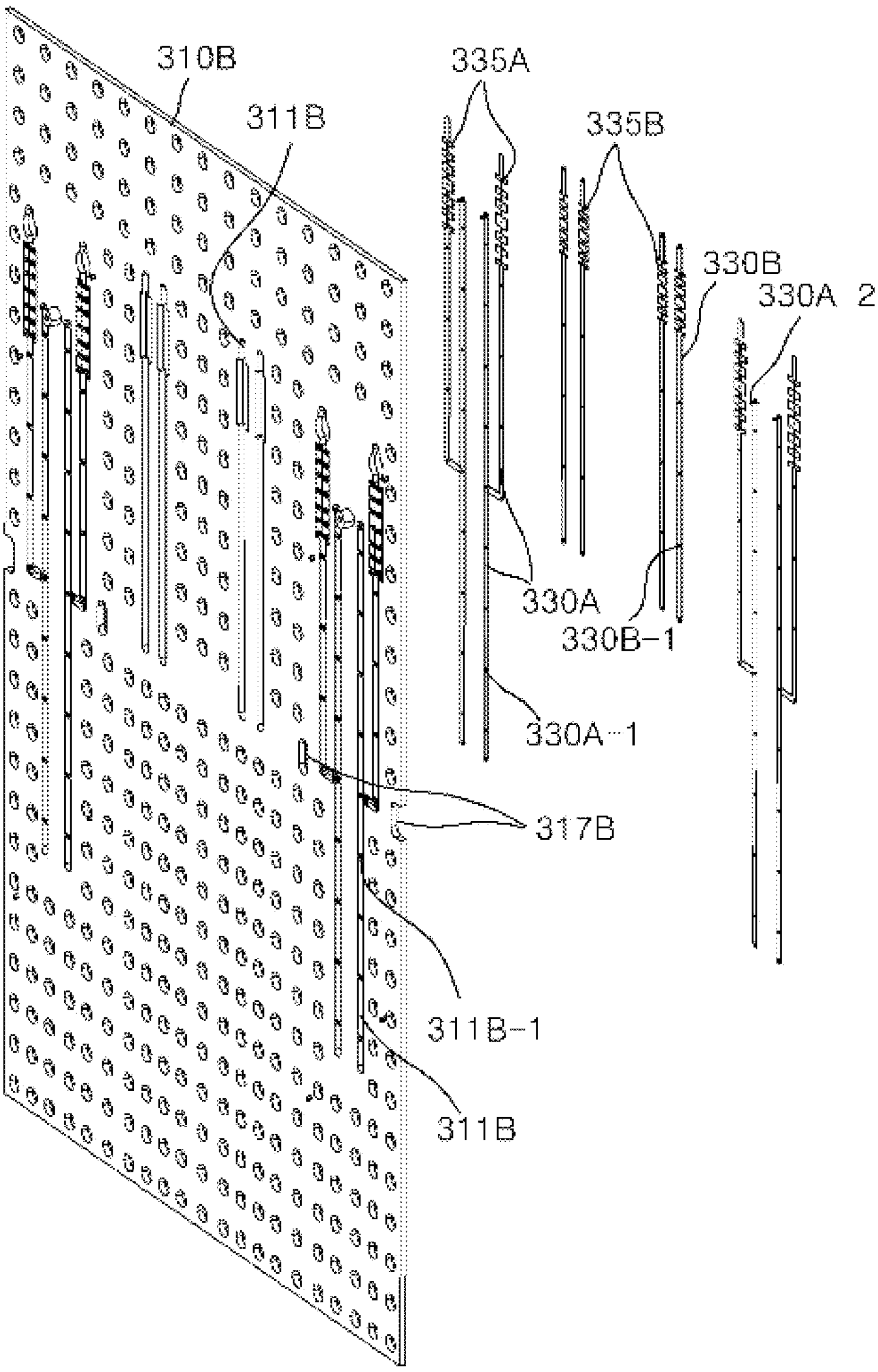

[FIG. 6B]
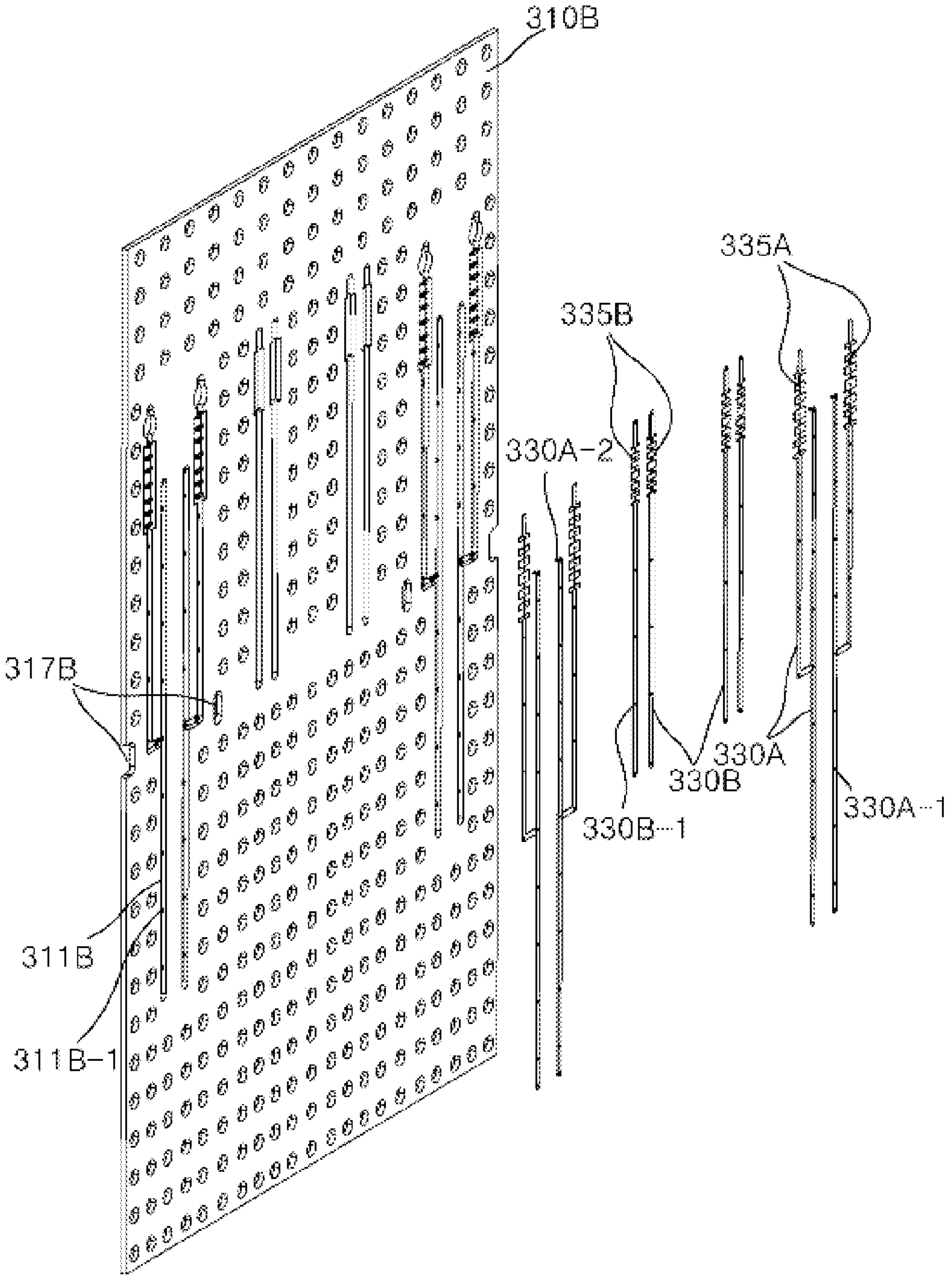

[FIG. 7A]
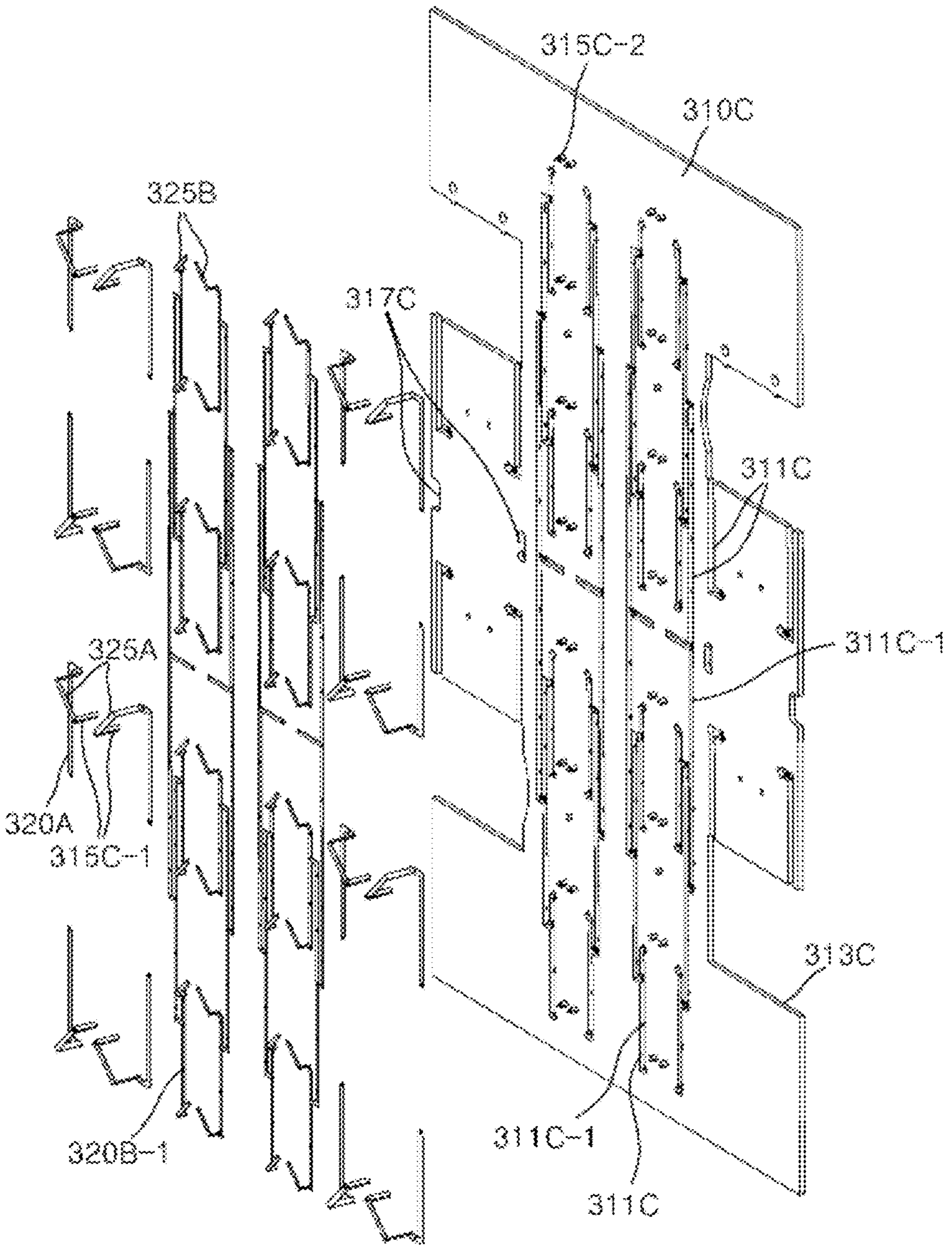

[FIG. 7B]
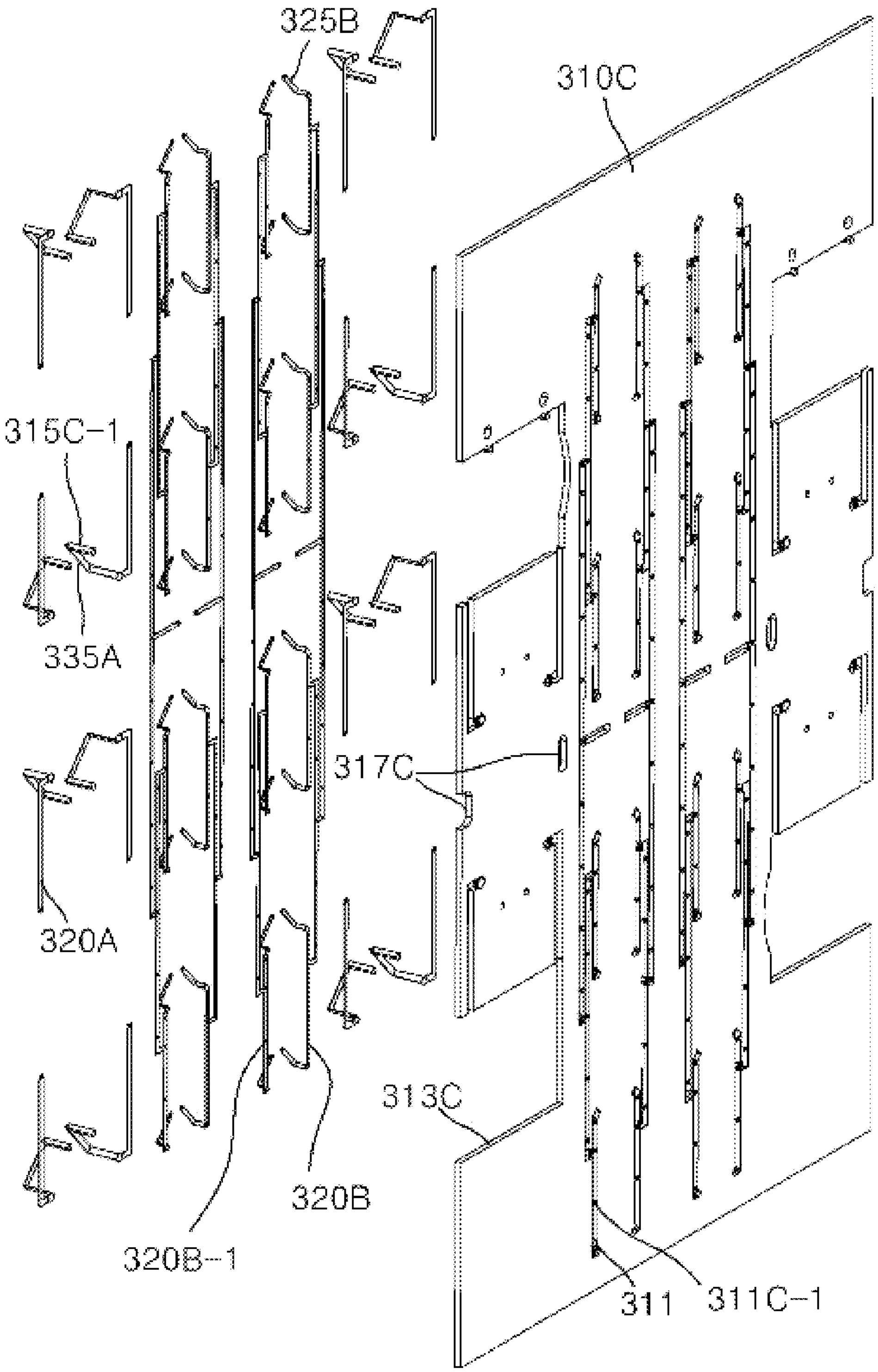

[FIG. 8]
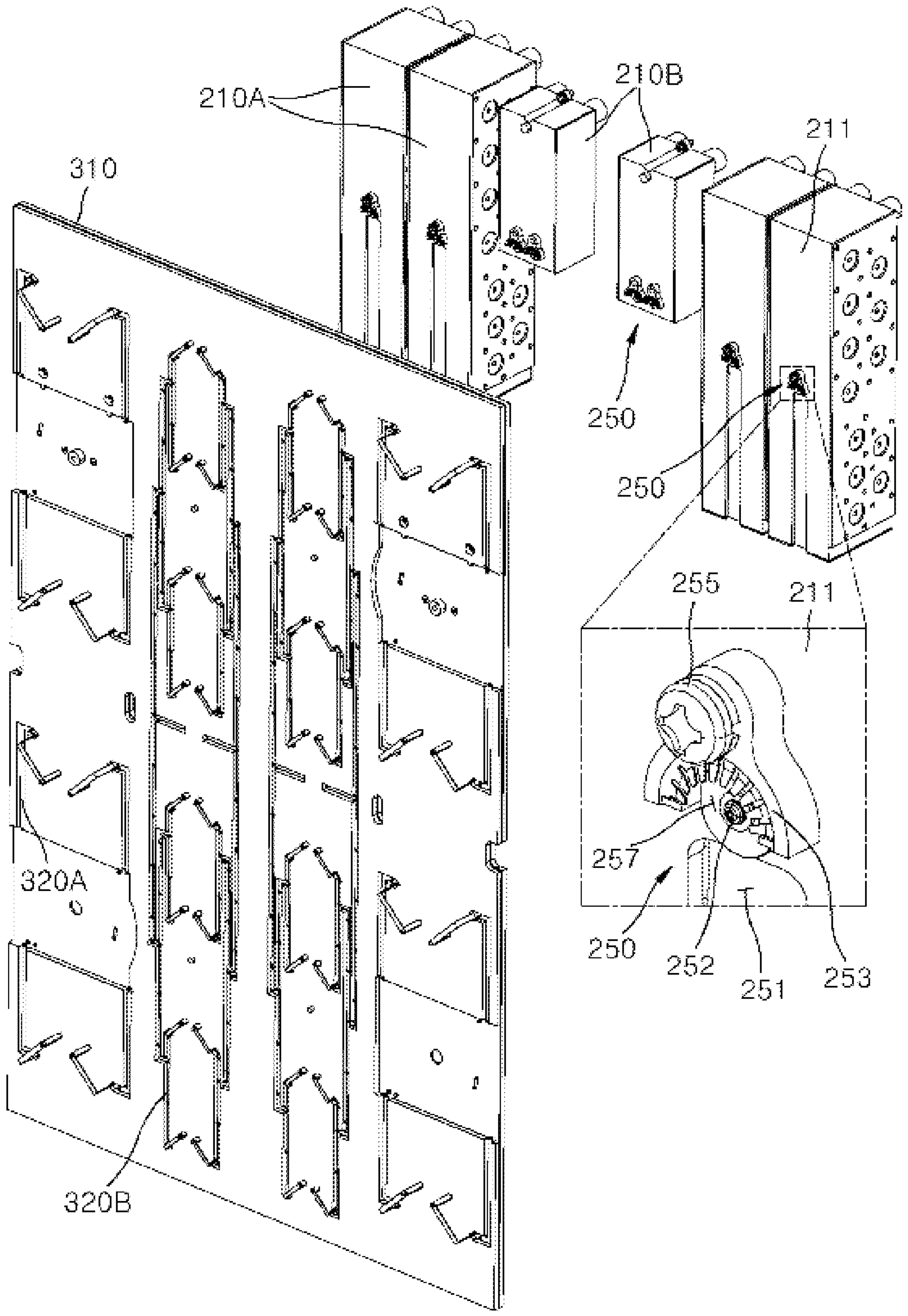

[FIG. 9]
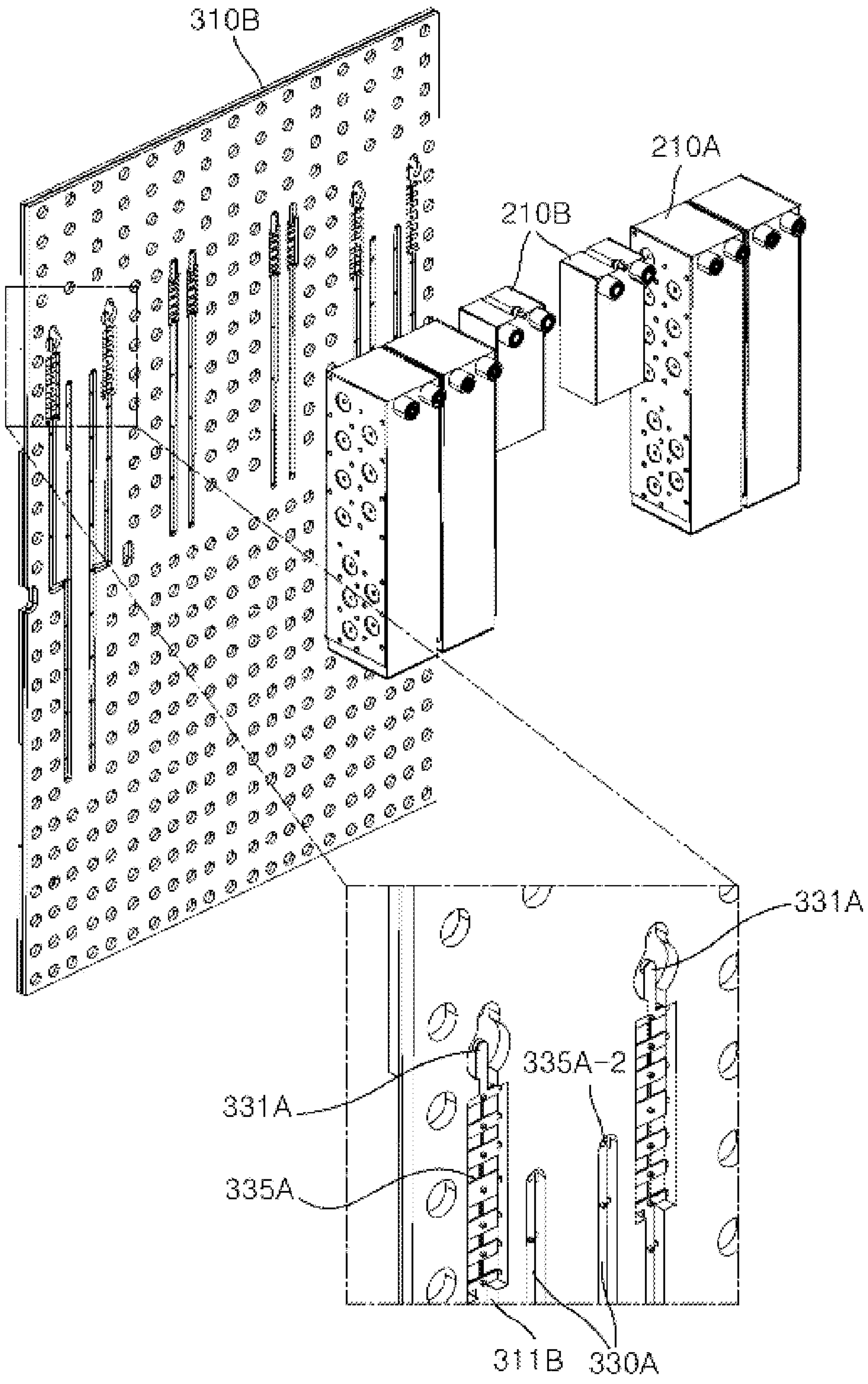

ANTENNA BOARD ASSEMBLY AND ANTENNA APPARATUS INCLUDING SAME

CROSS-REFERENCE TO RELATED APPLICATIONS

This application is a continuation application of International Application No. PCT/KR2023/000356, filed Jan. 9, 2023, which claims the benefit of Korean Patent Application Nos. 10-2022-0002899, filed Jan. 7, 2022; and 10-2023-0002648, filed Jan. 9, 2023, in the Korean Intellectual Property Office, the disclosures of which are incorporated herein in their entirety by reference.

TECHNICAL FIELD

The present disclosure relates to an antenna board assembly and an antenna apparatus including the same, and more particularly, to an antenna board assembly capable of minimizing an insertion loss by constructing a feed line that is patternized and printed on the existing PCB in a panel of a common plastic resin material as a feed strip line, that is, a conductor, and an antenna apparatus including the same.

Background Art

A wireless communication technology, for example, a multiple input multiple output (MIMO) technology, is a technology for significantly increasing a data transmission capacity by using multiple antennas, and is a spatial a transmitter transmits multiplexing scheme in which different data through transmission antennas and a receiver distinguishes between transmission data through proper signal processing.

Accordingly, as both the number of transmission antennas and the number of reception antennas are increased, more data can be transmitted because a channel capacity is increased. For example, if the number of antennas is increased to 10, a channel capacity that is about 10 times compared to a current single antenna system is secured by using the same frequency band.

In 4G LTE-advanced, up to 8 antennas are used. In a current pre-5G stage, a product on which 64 or 128 antennas have been mounted being developed. In 5G, it is expected that base station equipment having a much larger number of antennas will be used. This is called a massive MIMO technology. A current cell operation is 2-dimensional. In contrast, if the massive MIMO technology is introduced, 3D-beamforming is made possible, and the massive MIMO technology is also called full dimension (FD)-MIMO.

In particular, multiple array antenna elements may implement beamforming through an antenna radiation beam in order to provide an optimal service in accordance with a change in the use density of subscribers for each region and each time zone.

The multiple array antenna elements may be mounted on a front surface of an antenna element board coupled to a front part of an RF filter. Multiple transmission lines for electrically connecting the antenna element board and the RF filter may be patternized and printed on the front and rear surfaces of the antenna element board.

However, there is a problem in that performance of an antenna apparatus is deteriorated, because the antenna element board is made of a PCB material (e.g., an FR4 material) having a predetermined dielectric constant and an insertion loss attributable to the multiple transmission lines that are patternized and printed on the antenna element board is increased.

Furthermore, if a connection portion of the RF filter and the multiple transmission lines is connected by using a direct coaxial connector (DCC), a ground washer made of a conductive material that plays a role as a ground is provided around the DCC in front of the RF filter, and the multiple transmission lines need to be connected by avoiding the ground washer. There is a problem in that the entire thickness of a product is increased because a predetermined avoidance space needs to be provided between the RF filter and the antenna element board.

DISCLOSURE

Technical Problem

The present disclosure has been contrived to solve the technical problems, and an object of the present disclosure is to provide an antenna board assembly capable of improving system performance by reducing an insertion loss compared to the existing PCB material and an antenna apparatus including the same.

Furthermore, another object of the present disclosure is to provide an antenna board assembly capable of preventing an increase of the entire volume of a product because the antenna board assembly is provided to be easily electrically connected even without an increase of the volume of a connection portion of an RF filter and multiple transmission lines and an antenna apparatus including the same.

Objects of the present disclosure are not limited to the aforementioned objects, and the other objects not described above may be evidently understood from the following description by those skilled in the art.

Technical Solution

An antenna board assembly according to an embodiment of the present disclosure includes a reflecting panel provided to forward reflect antenna beams radiated by multiple array antenna elements that are provided in front of the reflecting panel, a rear panel stacked and coupled to a rear surface of the reflecting panel and made of a non-conductive material, and a front panel stacked and coupled to a front surface of the reflecting panel and made of a non-conductive material. The rear panel and the front panel are integrally molded by a dual injection method and stacked and coupled on the basis of the reflecting panel.

In this case, the antenna board assembly may further include multiple feed strip lines coupled to the front surface and rear surface of the reflecting panel in order to supply power to the multiple array antenna elements. At least one connection hole may be formed in the reflecting panel in forward and backward directions thereof in a way to penetrate the reflecting panel so that some of the multiple feed strip lines provided to supply power to the multiple array antenna elements are connected from the rear surface of the reflecting panel to the front surface thereof in a way to penetrate the reflecting panel.

Furthermore, the multiple feed strip lines may include a rear feed strip line disposed in the rear panel and having one end connected to an output port of unit RF filter bodies and the other end penetrating the at least one connection hole and a front feed strip line disposed in the front panel and having one end provided to be supplied with power from the rear feed strip line and the other end provided to supply power to the multiple array antenna elements. A strip line installation slit may be formed in each of the rear panel and the front panel so that the strip line installation slit penetrates the rear panel and the front panel in forward and backward directions thereof so that the rear feed strip line and the front feed strip line are accommodated in the strip line installation slit in a thickness range thereof.

Furthermore, multiple fixing pins may be formed in the strip line installation slit integrally with each of the rear panel and the front panel so that an arbitrary movement of the rear feed strip line and the front feed strip line is restrained. Multiple pin fixing holes to which the multiple fixing pins are fastened to penetrate the multiple pin fixing holes may be formed in the rear feed strip line and the front feed strip line.

Furthermore, the multiple fixing pins formed in the strip line installation slit may each be formed in a size in which the fixing pin protrudes to an outside of each of the multiple pin fixing holes so that the multiple fixing pins are fixed to the multiple pin fixing holes of the rear feed strip lines and then melted by external heat.

Furthermore, a part of one end of the rear feed strip line, which is connected to the output port of the RF filter body, may be provided as a low pass filter (LPF) for removing high frequency noise.

Furthermore, a front part of the LPF may be electrically connected through a medium of a direct coaxial connector (DCC) that is installed at the output port of the multiple unit RF filter bodies, and may be connected through an opened portion of a ground washer that is installed around the DCC in a semicircular form.

Furthermore, each of the rear feed strip line and the front feed strip line may have a form of a thin conductor bar of a conductive material, which does not exceed a thickness of each of a strip line installation slit (hereinafter referred to as a "rear installation slit") formed in the rear panel and a strip line installation slit (hereinafter referred to as a "front installation slit") formed in the front panel.

Furthermore, the rear feed strip line may be electrically connected to any one of an input stage of a variable circuit board that is fixed to the front surface of the reflecting panel and an input stage of the front feed strip line through the medium of a connection pin that is extended and formed at a front end of each rear feed strip line in a way to protrude forward.

Furthermore, the front feed strip line may have any one of a variable circuit board fixed to the front surface of the reflecting panel as an input stage connected to the rear feed strip line provided at one end thereof, and may have the other end supported by a support pin that is inserted and supported by the front surface of the front panel and connected to the multiple array antenna elements in a way to supply power thereto.

Furthermore, the antenna board assembly may further include a phase shifter that is fixed to the front surface of the reflecting panel and that includes a variable circuit board on a front surface of which a variable circuit capable of changing a phase of a frequency through at least a change in a physical length of a transmission line and having at least one power failure point is patternized and printed. A variable circuit board avoidance groove that is incised to expose the variable circuit board forward may be incised and formed in the front panel.

Furthermore, the phase shifter may include a phase shift driving motor fixed between the unit RF filter bodies in a rear of the rear panel, a horizontal mounting bar that moves while maintaining horizontality in up and down directions thereof in the rear of the rear panel in a rotation direction of a motor axis of the phase shift driving motor, a variable switch panel rotatably provided on a front surface of the variable circuit board fixed to the front surface of the reflecting panel, and a vertical mounting bar having one end connected to the horizontal mounting bar and the other end hinged and connected to the variable switch panel. An up and down guide slot for avoiding interference with an up and down movement of a hinge and connection pin that protrudes forward from the horizontal mounting bar and that is connected to the vertical mounting bar may be formed in the reflecting panel, the rear panel, and the front panel.

An antenna apparatus according to an embodiment of the present disclosure includes an RF filter including multiple unit RF filter bodies stacked and disposed on a front surface of a main board and a radiation element module including multiple array antenna elements provided to be electrically connected to the front of the RF filter and arranged to implement antenna beamforming. The radiation element module may include an antenna board assembly, including a reflecting panel provided to forward reflect antenna beams radiated by the multiple array antenna elements, a rear panel stacked and coupled to a rear surface of the reflecting panel and made of a non-conductive material, and a front panel stacked and coupled to a front surface of the reflecting panel. The rear panel and the front panel are made of a plastic resin material, among the non-conductive materials, and are integrally molded by a dual injection method and stacked and coupled on the basis of the reflecting panel made of a metal material.

Furthermore, an antenna apparatus according to an embodiment of the present disclosure includes the aforementioned antenna board assembly.

Advantageous Effects

According to the antenna board assembly and the antenna apparatus including the same according to an embodiment of the present disclosure, effects in that signal quality of a system can be improved because an insertion loss is significantly reduced and an increase of a front and rear thickness part can be prevented can be achieved by changing the existing PCB material of the antenna element board into a plastic resin material and installing the feed strip line corresponding to multiple transmission lines so that a medium, that is, a dielectric layer, becomes an air layer.

DESCRIPTION OF DRAWINGS

FIGS. 1A and 1B are perspective views of a front part and a rear part illustrating some components of an antenna board assembly and an antenna apparatus including the same according to an embodiment of the present disclosure.

FIG. 2 is an exploded perspective view illustrating a coupling structure for a phase shifter among the components of FIGS. 1A and 1B.

FIGS. 3A and 3B are front part and rear part exploded-perspective views of an antenna board assembly, among the components of FIGS. 1A and 1B.

FIGS. 4A and 4B are front part and rear part exploded-perspective views of a front feed strip line and a rear feed strip line including a low pass filter (LPF), among components of the antenna board assembly in FIGS. 1A and 1B.

FIGS. 5A and 5B are exploded perspective views of a reflecting panel and components related thereto, among the components of the antenna board assembly in FIGS. 1A and 1B.

FIGS. 6A and 6B are exploded perspective views of a rear panel and components related thereto, among the components of the antenna board assembly in FIGS. 1A and 1B.

FIGS. 7A and 7B are exploded perspective views of a front panel and components related thereto, among the components of the antenna board assembly in FIGS. 1A and 1B.

FIGS. 8 and 9 are perspective views of a front part and rear part illustrating a connection portion of a rear feed strip line including an RF filter and the LPF and each partial enlarged view thereof.

DESCRIPTION OF REFERENCE NUMERALS

210A, 210B: RF filter 211: unit RF filter body
251: air guide groove 250: output port
252: DCC 253: ground washer
257: opening portion 310: antenna board part
310A: reflecting panel 310B: rear panel
310C: front panel 311B: rear installation slit
311C: front installation slit 320A, 320B: front feed strip line
330A, 330B: rear feed strip line 335A, 335B: LPF

BEST MODE

Hereinafter, an antenna board assembly and an antenna apparatus including the same according to an embodiment of the present disclosure are described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the meanings as those in the context of a related same technology, and are not construed as having ideal or excessively formal meanings unless explicitly defined otherwise in the specification.

FIGS. 1A and 1B are front part and rear part perspective views illustrating some components of an antenna board assembly and an antenna apparatus including the same according to an embodiment of the present disclosure. FIG. 2 is an exploded perspective view illustrating a coupling structure for a phase shifter among the components of FIGS. 1A and 1B. FIGS. 3A and 3B are front part and rear part exploded-perspective views of an antenna board assembly, among the components of FIGS. 1A and 1B. FIGS. 4A and 4B are front part and rear part exploded-perspective views of a front feed strip line and a rear feed strip line including a low pass filter (LPF), among components of the antenna board assembly among components of FIGS. 1A and 1B.

An antenna apparatus according to an embodiment of the present disclosure may be an antenna apparatus into which a multiple-input multiple-output (MIMO) technology has been incorporated.

The MIMO technology is a technology for significantly increasing a data transmission capacity by using multiple array antenna elements, and is a spatial multiplexing scheme in which a transmitter transmits different data through transmission antennas and a receiver distinguishes between transmission data through proper signal processing. Accordingly, more data can be transmitted because a channel capacity may be increased as the numbers of transmission and reception antennas are simultaneously increased. For example, if the number of antennas is increased to 10, a channel capacity that is about 10 times compared to a single antenna system is secured by using the same frequency band.

In particular, in an antenna apparatus, TRx modules (not illustrated) that each perform transmitter and receiver functions may be vertically (V)-horizontally (H) arranged in up and down vertical directions and left and right horizontal directions thereof, and multiple array antenna elements 350 electrically connected to each TRx module may be arranged. In this case, the channel capacity of each TRx module may be redefined as an "RF chain". The multiple antenna elements may be defined as the "multiple array antenna elements 350" as described above as a group unit in which the multiple antenna elements are arranged for antenna beamforming.

In this case, in an MIMO antenna apparatus for mobile communication, in general, the multiple array antenna elements 350 are designed as a plurality of dual polarization antenna module arrays in order to reduce a fading influence by multiple paths and to perform a polarization diversity function.

More specifically, the antenna apparatus according to an embodiment of the present disclosure may include an antenna housing part (not illustrated) that forms an external appearance of the antenna apparatus on left and right sides and a rear side thereof, and a radome panel (not illustrated) that is provided to form an external appearance of the antenna apparatus in front thereof and to shield an opened front surface of the antenna housing part and that protects internal parts (including an RF filter 210 and an antenna board assembly 310 that are described later) that are provided in an internal space of the antenna housing part against the outside.

In this case, functions and detailed characteristics of the antenna housing part and the radome panel have very less correlation with technical characteristics of an embodiment of the present disclosure, and thus a detailed description thereof is omitted.

The RF filter 210 may include multiple unit RF filter bodies that are disposed on a front surface of a main board (not illustrated) disposed in the internal space of the antenna housing part.

In this case, as referenced in FIGS. 1A and 1B, the RF filter 210 may be provided in a dual band antenna type to which various specifications have been complexly applied in order to cover a plurality of frequency bands. For example, the RF filter 210 may be an RF filter for a low frequency (refer to reference numeral 210A) in order to cover a low frequency band and may be an RF filter for a high frequency (refer to reference numeral 210B) for covering a high frequency band.

In particular, as referenced in FIG. 1B, the RF filter 210A for a low frequency has a relatively greater size than the RF filter 210B for a high frequency. The area of a radiation surface of a low frequency band antenna patch element 350A, among array antenna elements 350 that are electrically connected to the RF filter 210A for a low frequency to be supplied with power and that are described later, at the front of the apparatus may be formed to be greater than the area of a radiation surface of a high frequency band antenna patch element 350B.

Meanwhile, the antenna apparatus according to an embodiment of the present disclosure may further include a radiation element module 300 including the multiple array antenna elements 350 that are electrically connected to the front of the RF filter 210 constructed as above and that are arranged to implement antenna beamforming.

The radiation element module 300 may include the antenna board assembly 310 in which the multiple array antenna elements 350 are fixed so that the multiple array antenna elements are V-H arranged on a front surface of the antenna board assembly.

In this case, the "V-H arranged" may mean a direction in which the multiple array antenna elements 350 are arranged, wherein the up and down vertical directions of the front surface of the antenna board assembly 310 may be defined as a "vertical (V) direction" and the left and right horizontal directions of the front surface of the antenna board assembly 310 may be defined a "horizontal (H) direction", as described above.

Meanwhile, as referenced in FIG. 3A, the antenna board assembly 310 according to an embodiment of the present disclosure may include a reflecting panel 310A that is provided to reflect antenna beams radiated from the multiple array antenna elements 350 forward, a rear panel 310B that is stacked and coupled to a rear surface of the reflecting panel 310A, and a front panel 310C that is stacked and coupled to a front surface of the reflecting panel 310A.

The reflecting panel 310A may be made of an electromagnetic shielding material that may not transmit an antenna beam, and may be formed of a metal material, preferably, having a high melting point at least. Furthermore, it is preferred that the rear panel 310B and the front panel 310C provided on the rear surface and front surface of the reflecting panel 310A are made of a plastic resin material which can be easily integrally manufactured with the reflecting panel 310A by a molding process (e.g., a dual injection method that is described later), as a nonconductor (non-conductive) material.

More specifically, in the antenna board assembly 310, the material of the reflecting panel 310A is a heterogeneous material that is different from materials that constitute the rear panel 310B and the front panel 310C, and may be a plastic resin material which can be easily integrally manufactured with the rear panel 310B and the front panel 310C by the dual injection method on the basis of the reflecting panel 310A.

For reference, conventionally, the antenna board part 310 is provided in the form of a printed circuit board as a common PCB material (e.g., an FR4 material), and a power feeding line (a transmission line that is a component corresponding to a feed strip line of the present disclosure, which is described later) is printed and formed on a front surface or rear surface of the printed circuit board by a pattern printing process.

If the power feeding line is printed and formed on the front surface or rear surface of the printed circuit board by the pattern printing process, there is a problem in that an insertion loss is increased because the power feeding line is directly formed in the dielectric layer having a predetermined dielectric constant, which has already been described in the item "Background Art".

Meanwhile, in the antenna apparatus according to an embodiment of the present disclosure, as referenced in FIGS. 1A to 4B, the radiation element module 300 is arranged to penetrate the reflecting panel 310A or penetrate at least any one of the rear panel 310B and the front panel 310C, and may further include multiple feed strip lines 320A, 320B, 330A, and 330B that are arranged for an electrical connection with the RF filters 210A and 210B and that are made of a conductive material.

As referenced in FIGS. 3A and 3B, the multiple feed strip lines 320A, 320B, 330A, and 330B include multiple rear feed strip lines 330A and 330B disposed in the rear panel 310B and multiple front feed strip lines 320A and 320B disposed in the front panel 310C, which are described more specifically later.

In this case, strip line installation slits 311B and 311C may be formed in the rear panel 310B and the front panel 310C, respectively, among the components of the antenna board assembly 310, in forward and backward directions of the rear panel and the front panel, respectively, in a way to penetrate therethrough so that the multiple feed strip lines 320A and 320B, and 330A and 330B are accommodated in the strip line installation slits, respectively, through the medium of an air layer.

Likewise, a strip line installation slit of the strip line installation slits 311B and 311C, which is formed in the rear panel 310B, may be defined as a "rear installation slit 311B". A strip line installation slit of the strip line installation slits 311B and 311C, which is formed in the front panel 310C, may be defined as a "front installation slit 311C".

Electrical connection structures and characteristics of the multiple feed strip lines 320A, 320B, 330A, and 330B for the strip line installation slits 311B and 311C of the rear panel 310B and the front panel 310C are described more specifically later.

Meanwhile, as referenced in FIGS. 1A and 1B and 2, the antenna apparatus according to an embodiment of the present disclosure may further include a phase shifter 500 that implements a desired phase shift value by physically changing the length of the transmission lines of the front feed strip lines 320A and 320B that are connected from the RF filter 210 to the multiple array antenna elements 350 to change the phase of antenna the apparatus by a predetermined value with respect to the same surface for a reference phase.

In a mobile communication system, a fixed type antenna was first used as a base station antenna. Recently, a vertical beam tilt control antenna capable of vertical (and/or horizontal) beam tilting is distributed due to its many advantages. In the vertical beam tilt control antenna, a beam tilt method may be basically divided into a mechanical beam tilt method and an electrical beam tilt method. In the antenna apparatus according to an embodiment of the present disclosure, the phase shifter 500 using the mechanical beam tilt method is adopted.

In general, the mechanical beam tilt method is a method based on a manual or power-driving bracket structure that is provided at a portion of an antenna, which is coupled to a support pole. The vertical beam tilt of the antenna is made possible because the installation tilt of the antenna is changed by an operation of the bracket structure.

The phase shifter 500 may include a phase shift driving motor 510 fixed between the unit RF filter bodies on the rear surface side of the antenna board assembly 310, a horizontal mounting bar 520 that moves while maintaining horizontality in the up and down directions thereof on the rear surface side of the antenna board part 310 in the rotation direction of the motor axis of the phase shift driving motor 510, a vertical mounting bar 530 that has one end connected to the horizontal mounting bar 520 and the other end hinged and connected to a variable switch panel 540 that is described later, and the variable switch panel 540 that is rotatably provided on a front surface of a variable circuit board 505 that is fixed to the front surface of the reflecting panel 310A of the antenna board assembly 310.

The phase shifter 500 may be applied to all of dual band antenna types in which a plurality of frequency bands can be covered. As referenced in FIGS. 1A and 1B, the phase shifter may be provided to change only the phase value of an antenna beam that is related to the low frequency band antenna patch element 350A.

The variable circuit board 505 is a kind of a printed circuit board. A variable circuit having at least one power failure point and capable of changing the phase of a frequency through the transmission line may be patternized and printed on the front surface of the variable circuit board. At least one energization terminal pattern that energizes the power failure point of the variable circuit board 505 may be printed and formed on a rear surface of the variable switch panel 540.

In this case, the variable switch panel 540 is provided to be always elastically supported toward the front surface of the variable circuit board 505 through the medium of an elastic member 570 that is provided as a leaf spring. The elastic member 570 may be elastically supported toward the variable switch panel 540 by being hinged and fixed by the hinge panel 571.

Meanwhile, the variable circuit board 505 may be electrically connected and powered by the rear feed strip lines 330A and 330B that are disposed on the rear surface of the antenna board assembly 310.

More specifically, the other end of each of the rear feed strip lines 330A and 330B is formed to protrude forward so that the rear feed strip line penetrates the reflecting panel 310A, and may be connected to at least two input points 507*a* and 507*b* of the variable circuit 506 that is formed on the variable circuit board 505 by patterning and printing.

The variable circuit 506 that is printed and formed on the variable circuit board 505 may perform a function as a length variable pattern for changing the physical transmission length of a power supply signal that is supplied by the rear feed strip line 330A, toward a first polarization side and second polarization side of each of the multiple array antenna elements 350 for dual polarization beamforming via the front feed strip line 320A that is branched from the input points 507*a* and 507*b*

In this case, a variable circuit board avoidance groove 313C that is incised to expose the variable circuit board 505 forward may be incised and formed in the front panel 310C. The variable switch panel 540 may be disposed in front of the variable circuit board 505 that is exposed through the variable circuit board avoidance groove 313C as described above in a way to be rotatable by the vertical mounting bar 530.

Furthermore, the horizontal mounting bar 520 may be disposed in a rear part of the rear panel 310B, and may be disposed to not interfere with the unit RF filter 210A for covering a low frequency band, among the RF filters 210A and 210B that are disposed to be spaced apart therefrom in the V direction. The vertical mounting bar 530 may be disposed in front of the front panel 310C. Multiple hinge and connection pins 525 that are provided for hinge and connection with the vertical mounting bar 530 may be formed in a front part of the horizontal mounting bar 520 in a way to protrude forward by a predetermined length.

In this case, as referenced in FIG. 2, up and down guide slots 317A, 317B, and 317C through which the multiple hinge and connection pins 525 of the horizontal mounting bar 530 penetrate and for avoiding interference with an up and down movement of the horizontal mounting bar 530 may be formed in the reflecting panel 310A, the rear panel 310B, and the front panel 310C, respectively.

Meanwhile, the vertical mounting bar 530 and the variable switch panel 540 may be hinged and coupled to be relatively rotatable because a hinge screw 535 is fastened to the variable switch panel 540 through a screw through hole 533 as referenced in FIG. 2.

FIGS. 5A and 5B are exploded perspective views of the reflecting panel and components related thereto, among the components of the antenna board assembly in FIGS. 1A and 1B. FIGS. 6A and 6B are exploded perspective views of the rear panel and components related thereto, among the components of the antenna board assembly in FIGS. 1A and 1B. FIGS. 7A and 7B are exploded perspective views of the front panel and components related thereto, among the components of the antenna board assembly in FIGS. 1A and 1B.

Referring to FIGS. 5A and 5B, the reflecting panel 310A has a panel type made of a material capable of shielding electromagnetic waves. The variable circuit board 505, among the components of the phase shifter 500, may be fixed to the front surface of the reflecting panel as described above. The at least one connection hole 311A may be formed in a way to penetrate therethrough in forward and backward directions thereof so that a part of the rear feed strip line 330A, 330B is connected in a way to penetrate the at least one connection hole from the rear surface side of the at least one connection hole to the front surface side thereof.

Meanwhile, in the antenna apparatus according to an embodiment of the present disclosure, the multiple rear feed strip lines 330A and 330B may be installed in the rear panel 310B as referenced in FIGS. 6A and 6B. The multiple front feed strip lines 320A and 320B may be installed in the front panel 310C as referenced in FIGS. 7A and 7B.

The rear feed strip line 330A, 330B may have one end connected to an output port (refer to "250" in FIG. 8) of the unit RF filter body and the other end connected to the two input points 507*a* and 507*b* that are formed in the variable circuit 506 of the variable circuit board 505.

Furthermore, the rear feed strip line 330A, 330B may include a low pass filter (LPF) 335A, 335B for removing high frequency noise at a part of one end thereof, which is connected to the output port 250 of the unit RF filter body.

In the rear feed strip line 330A, 330B, the remaining portion except the part of the LPF 335A, 335B that has been provided to remove high frequency noise may be provided in the form of a thin conductor bar of a conductive material.

That is, it is preferred that the rear feed strip line 330A, 330B is thinly manufactured so that the rear feed strip line can be accommodated and installed in a strip line installation slit 311B (corresponding to a "rear installation slit" that is described later).

The LPFs 335A are 335B are formed in different shapes depending on the specifications of the RF filters 210A and 210B, and may include a first LPF 335A and a second LPF 335B. In this case, the LPFs 335A and 335B are differently provided depending on the specifications of the RF filters 210A and 210B, but the LPFs 335A and 335B are substantially the same in terms of the function for removing high frequency noise from a predetermined frequency band.

Accordingly, only any one of the LPFs is described, and meaningless duplicate descriptions thereof are omitted.

Meanwhile, as referenced in FIGS. 6A and 6B, the strip line installation slit 311B (hereinafter abbreviated as a "rear installation slit") in which the rear feed strip lines 330A and 330B including the portions of the LPFs 335A and 335B are accommodated may be formed in the rear panel 310B so that the strip line installation slit penetrates the rear panel in forward and backward directions thereof. However, the entire rear installation slit 311B does not need to be essentially formed so that the entire rear installation slit penetrates the rear panel in the forward and backward directions, may be processed in the form of a groove that is opened at least backward, and may be formed to penetrate only a portion at which the LPFs 335A and 335B have been formed in the forward and backward directions.

In particular, the rear feed strip lines 330A and 330B including the LPFs 335A and 335B are each provided in the form of a thin conductor bar to the extent that the thin conductor bar is accommodated within the rear installation slit 311B. An air dielectric layer having the dielectric constant of the air is naturally formed within the rear installation slit 311B. This leads to the accomplishment of the same effect as that a transmission line has been constructed in the air dielectric layer.

Furthermore, multiple fixing pins 311B-1 may be formed within the rear installation slit 311B integrally with the rear panel 310B so that an arbitrary movement of the rear feed strip lines 330A and 330B including the LPFs 335A and 335B that are accommodated in the rear installation slit 311B is restrained. Multiple pin fixing holes 330A-1 to which the multiple fixing pins 311B-1 are fastened in a way to penetrate therethrough may be formed in the rear feed strip lines 330A and 330B including the LPFs 335A and 335B.

After the multiple fixing pins 311B-1 are fixed to the multiple pin fixing holes 330A-1, respectively, in a way to penetrate therethrough, the front ends of the multiple fixing pins may be then heated by external heat using a predetermined heating tool and melted and fixed to the outside parts of the multiple pin fixing holes 330A-1.

More specifically, the multiple fixing pins 311B-1 formed in the rear installation slit 311B may each be formed in a size in which the fixing pin protrudes to the outside of each of the multiple pin fixing holes 330A-1 so that the multiple fixing pins are fixed to the multiple pin fixing holes 330A-1 of the rear feed strip lines 330A and 330B and then melted by external heat.

A connection pin 330A-2 may be formed integrally with the front end of each of the rear feed strip lines 330A and 330B, but may be extended and formed to forward protrude, and may be electrically connected to the input points 507*a* and 507*b* of the variable circuit board 505 or input stages 327*a* and 327*b* of the front feed strip line 320A, 320B, which are fixed to the front surface of the reflecting panel 310A, through the medium of the connection pin 330A-2.

Meanwhile, as referenced in FIGS. 7A and 7B, the front feed strip lines 320A and 320B that are provided for power feeding to the multiple array antenna elements 350 may be arranged in the front panel 310C.

Furthermore, the strip line installation slit 311C (hereinafter abbreviated as a "front installation slit") in which the front feed strip line 320A, 320B can be accommodated and fixed as described above may be formed in the front panel 310C.

The front installation slit 311C is also formed to penetrate the front panel in forward and backward directions thereof, like the rear installation slit 311B, but may be formed in a form corresponding to the arrangement shape of the front feed strip line 320A, 320B.

Furthermore, multiple fixing pins 311C-1 may each be formed within the front installation slit 311C integrally with the front panel 310C so that an arbitrary movement of the front feed strip line 320A, 320B that is accommodated within the front installation slit is restrained. Multiple pin fixing holes 320B-1 to which the multiple fixing pins 311C-1 are fixed to penetrate the multiple pin fixing holes may be formed in the feed strip line 320A and 320B. Shape characteristics of the multiple fixing pins 311C-1 and a method of fixing the multiple fixing pins 311C-1 to the multiple pin fixing holes 320B-1 are the same as those of the rear panel 310B, and a detailed description thereof to the extent of overlapping is omitted.

One end of the front feed strip line 320A, 320B may be provided as an input stage that is electrically connected to the variable circuit board 505 or that is connected to the connection pin 330A-2 of the feed strip line 335B provided in the rear panel 310B. The other end 325A, 325B of the front feed strip line 320A, 320B may be supported to a front surface of the front panel 310C by the support pin 315C-1, 315C-2, and may be connected to supply power to the multiple array antenna elements 350.

As described above, the rear feed strip lines 330A and 330B and the front feed strip lines 320A and 320B each have the form of the thin conductor bar of a conductive material, which does not exceed the thickness of each of the rear installation slit 311B formed in the rear panel 310B and the front installation slit 311C formed in the front panel 310C. Accordingly, an insertion loss can be minimized through the air dielectric layers formed by the rear installation slit 311B and the front installation slit 311C.

That is, in the antenna apparatus according to an embodiment of the present disclosure, compared to a conventional technology, a method of manufacturing the antenna board assembly 310 into a printed circuit board made of a common PCB material is excluded. The antenna board assembly is integrally molded by the rear panel 310B and the front panel 310C that are made of plastic resin materials on the rear surface and front surface thereof on the basis of the reflecting panel 310A made of a shielding material of a metal material, but the rear feed strip lines 330A and 330B and the front feed strip lines 320A and 320B each performing the function of a transmission line are accommodated in the air dielectric layer. Accordingly, an advantage capable of minimizing an insertion loss can be created.

FIGS. 8 and 9 are perspective views of a front part and rear part illustrating a connection portion of the rear feed strip line including the RF filter and the LPF and each partial enlarged view thereof.

Referring to FIGS. 8 and 9, the output port 250 of the unit RF filter body 211 in the RF filter 210A, 210B and a front part 331A of the LPF 335A, 335B may be connected through the medium of a direct coaxial connector 252.

Conventionally, the LPF 335A, 335B is installed in a portion of the output port 250 within the unit RF filter body 211 and provided to remove high frequency noise. In this case, however, there are disadvantages in that the volume of the unit RF filter body 211 is increased and an internal design thereof is very complicated. In order to solve such problems, an embodiment of the present disclosure proposes a connection construction in which the LPFs 335A and 335B are provided outside the unit RF filter body 211 and which can minimize an insertion loss.

More specifically, in general, the direct coaxial connector 252 is a component one end and the other end of which in an axial direction thereof are provided to come into contact with two contact parts. One end of the direct coaxial connector in the axial direction comes into contact with the output port 250 of the unit RF filter body 211, and the other end thereof in the axial direction comes into contact with the front part 331A of the LPF 335A, 335B that is provided at one end of the rear feed strip line 330A, 330B.

In this case, the direct coaxial connector 252 is provided to protrude toward the antenna board assembly 310 (in particular, a rear surface of the rear panel 310B). A ground washer 253 may be fixed to a unit RF filter body 211 through the medium of a washer fixing screw 255 and provided around the axis of the direct coaxial connector 252 so that the ground washer performs a ground function.

It is preferred that the common ground washer 253 is provided to surround the entire surroundings of the shaft of the direct coaxial connector 252 in a circle. In this case, however, in order to connect the front part 331A of the LPF 335A, 335B to the other end of the direct coaxial connector 252, bypass curved processing is required so that the front part 331A of the LPF 335A, 335B does not interfere with the ground washer 253. If the front part 331A of the LPF 335A, 335B is bent and processed, the front surface of the unit RF filter body 211 and the antenna board 310 need to be further separated from each other in order to secure a more sufficient space. In this case, the ground washer 253 cannot perform a full ground (GND) function in that the ground washer has to be separated from the rear surface side of the antenna board 310.

Therefore, in the antenna apparatus according to an embodiment of the present disclosure, the ground washer 253 may be provided to be incised and processed in a semi-circular form and installed around the direct coaxial connector 252 so that the ground washer can come into direct contact with the other end of the direct coaxial connector 252 even without bending processing for the front part 331A of the LPF 335A, 335B. In this case, the front part 331A of the LPF 335A, 335B may be connected through an opened portion 257 of the ground washer 253.

Meanwhile, an air guide groove 251 having the same groove shape as a portion corresponding to the rear installation slit 311B may be processed and formed in a front surface of the unit RF filter body 211 so that the feed strip line 330A, 330B including the LPF 335A, 335B is accommodated in the air guide groove through the medium of the air dielectric layer.

As described above, the antenna apparatus according to an embodiment of the present disclosure has advantages in that design difficulties of the unit RF filter body 211 can be solved and an insertion loss can be reduced because the antenna apparatus includes the ground washer 253 having a semi-circular form and is provided to be electrically connected through the opened portion 257 without bending processing for the front part 331A of the LPF 335A, 335B.

The antenna apparatus according to an embodiment of the present disclosure has been described above in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

Industrial Applicability

The present disclosure provides the antenna board assembly which can improve system performance by reducing an insertion loss compared to the existing PCB material and can prevent an increase of the entire volume of a product by enabling an easy electrical connection even without an increase of the volume of a connection portion of the RF filter and multiple transmission lines, and an antenna apparatus including the same.

The invention claimed is:

1. An antenna board assembly comprising:

a reflecting panel provided to forward reflect antenna beams radiated by multiple array antenna elements that are provided in front of the reflecting panel;

a rear panel stacked and coupled to a rear surface of the reflecting panel and made of a non-conductive material; and a front panel stacked and coupled to a front surface of the reflecting panel and made of a non-conductive material, wherein the rear panel and the front panel are made of a plastic resin material and are integrally molded by a dual injection method, and the rear panel and the front panel are stacked and coupled on the basis of the reflecting panel made of a metal material.

2. An antenna apparatus comprising the antenna board assembly according to claim 1.

3. An antenna board assembly comprising:

a reflecting panel provided to forward reflect antenna beams radiated by multiple array antenna elements that are provided in front of the reflecting panel;

a rear panel stacked and coupled to a rear surface of the reflecting panel and made of a non-conductive material; and a front panel stacked and coupled to a front surface of the reflecting panel and made of a non-conductive material, wherein the rear panel and the front panel are integrally molded by a dual injection method, and the rear panel and the front panel are stacked and coupled on the basis of the reflecting panel made of a metal material, wherein the antenna board assembly further comprises multiple feed strip lines coupled to the front surface and rear surface of the reflecting panel in order to supply power to the multiple array antenna elements, and wherein at least one connection hole is formed in the reflecting panel in forward and backward directions thereof in a way to penetrate the reflecting panel so that some of the multiple feed strip lines provided to supply power to the multiple array antenna elements are connected from the rear surface of the reflecting panel to the front surface thereof in a way to penetrate the reflecting panel.

4. The antenna board assembly according to claim 3, wherein the multiple feed strip lines comprise:

a rear feed strip line disposed in the rear panel and having one end connected to an output port of unit RF filter bodies and the other end penetrating the at least one connection hole; and a front feed strip line disposed in the front panel and having one end provided to be supplied with power from the rear feed strip line and the other end provided to supply power to the multiple array antenna elements, wherein a strip line installation slit is formed in each of the rear panel and the front panel in a way to penetrate therethrough in forward and backward directions thereof so that the rear feed strip line and the front feed strip line are accommodated in the strip line installation slit in a thickness range thereof.

5. The antenna board assembly according to claim 4, wherein:

multiple fixing pins are formed in the strip line installation slit integrally with each of the rear panel and the front panel so that an arbitrary movement of the rear feed strip line and the front feed strip line is restrained, and multiple pin fixing holes to which the multiple fixing pins are fastened to penetrate the multiple pin fixing holes are formed in the rear feed strip line and the front feed strip line.

6. The antenna board assembly according to claim 5, wherein the multiple fixing pins formed in the strip line installation slit are each formed in a size in which the fixing pin protrudes to an outside of each of the multiple pin fixing holes so that the multiple fixing pins are fixed to the multiple pin fixing holes of the rear feed strip lines and then melted by external heat.

7. The antenna board assembly according to claim 4, wherein a part of one end of the rear feed strip line, which is connected to the output port of the RF filter body, is provided as a low pass filter (LPF) for removing high frequency noise.

8. The antenna board assembly according to claim 7, wherein a front part of the LPF is electrically connected through a medium of a direct coaxial connector (DCC) that is installed at the output port of the multiple unit RF filter bodies, and is connected through an opened portion of a ground washer that is installed around the DCC in a semi-circular form.

9. The antenna board assembly according to claim 4, wherein each of the rear feed strip line and the front feed strip line has a form of a thin conductor bar of a conductive material, which does not exceed a thickness of each of a strip line installation slit (hereinafter referred to as a "rear installation slit") formed in the rear panel and a strip line installation slit (hereinafter referred to as a "front installation slit") formed in the front panel.

10. The antenna board assembly according to claim 4, wherein the rear feed strip line is electrically connected to any one of an input stage of a variable circuit board that is fixed to the front surface of the reflecting panel and an input stage of the front feed strip line through a medium of a connection pin that is extended and formed at a front end of each rear feed strip line in a way to protrude forward.

11. The antenna board assembly according to claim 4, wherein the front feed strip line has any one of a variable circuit board fixed to the front surface of the reflecting panel and an input stage connected to the rear feed strip line provided at one end thereof, and has the other end supported by a support pin that is inserted and supported by the front surface of the front panel and connected to the multiple array antenna elements in a way to supply power thereto.

12. The antenna board assembly according to claim 4, further comprising a phase shifter that is fixed to the front surface of the reflecting panel and that comprises a variable circuit board on a front surface of which a variable circuit capable of changing a phase of a frequency through at least a change in a physical length of a transmission line and having at least one power failure point is patternized and printed, wherein a variable circuit board avoidance groove that is incised to expose the variable circuit board forward is incised and formed in the front panel.

13. The antenna board assembly according to claim 12, wherein the phase shifter comprises:

a phase shift driving motor fixed between the unit RF filter bodies in a rear of the rear panel;

a horizontal mounting bar that moves while maintaining horizontality in up and down directions thereof in the rear of the rear panel in a rotation direction of a motor axis of the phase shift driving motor;

a variable switch panel rotatably provided on a front surface of the variable circuit board fixed to the front surface of the reflecting panel; and a vertical mounting bar having one end connected to the horizontal mounting bar and the other end hinged and connected to the variable switch panel, wherein an up and down guide slot for avoiding interference with an up and down movement of a hinge and connection pin that protrudes forward from the horizontal mounting bar and that is connected to the vertical mounting bar is formed in the reflecting panel, the rear panel, and the front panel.

14. An antenna apparatus comprising:

an RF filter comprising multiple unit RF filter bodies stacked and disposed on a front surface of a main board; and a radiation element module comprising multiple array antenna elements provided to be electrically connected to a front of the RF filter and arranged to implement antenna beamforming, wherein the radiation element module comprises an antenna board assembly, comprising a reflecting panel provided to forward reflect antenna beams radiated by the multiple array antenna elements, a rear panel stacked and coupled to a rear surface of the reflecting panel and made of a non-conductive material, and a front panel stacked and coupled to a front surface of the reflecting panel, and the rear panel and the front panel are made of a plastic resin material and are integrally molded by a dual injection method, and the rear panel and the front panel are stacked and coupled on the basis of the reflecting panel made of a metal material.

* * * * *